Feb. 10, 1970 ICHIRO KONO ET AL 3,494,236
CIRCUIT SYSTEM FOR YARN REJECTION DEVICE
Filed April 24, 1967

INVENTORS.
ICHIRO KONO
TETUO NUKUSINA
HIROBUMI TUBOSAKA

AGENT 3,494,236
Patented Feb. 10, 1970

3,494,236
CIRCUIT SYSTEM FOR YARN REJECTION DEVICE
Ichiro Kono, Tetuo Nukusina, and Hirobumi Tubosaka, Tokyo, Japan, assignors to Jonan Electric Co., Ltd., Kawasaki-shi, Kanagawa-ken, Japan, a corporation of Japan
Filed Apr. 24, 1967, Ser. No. 633,066
Claims priority, application Japan, Apr. 25, 1966, 41/25,872
Int. Cl. B26d 5/00
U.S. Cl. 83—365                                6 Claims

ABSTRACT OF THE DISCLOSURE

The output of a photoelectric yarn sensor (1) is compared in a differential amplifier (2) with a reference potential generated by a corrective circuit (9) in response to a starting signal which appears in the output of that amplifier upon the initial insertion of the yarn to be monitored. The output signal from the amplifier is fed in parallel to two discriminators (4, 8), respectively sensitive to positive and negative deviations of yarn diameter from the norm, to actuate a yarn cutter on detecting such deviations. The first discriminator (4) is initially maintained at a high operating threshold to prevent cutoff during yarn insertion and is then switched to a lower threshold by a control circuit (6) responsive to a ripple signal from the amplifier (2) due to minor irregularities unavoidably present in the running yarn.

---

Figure 1:
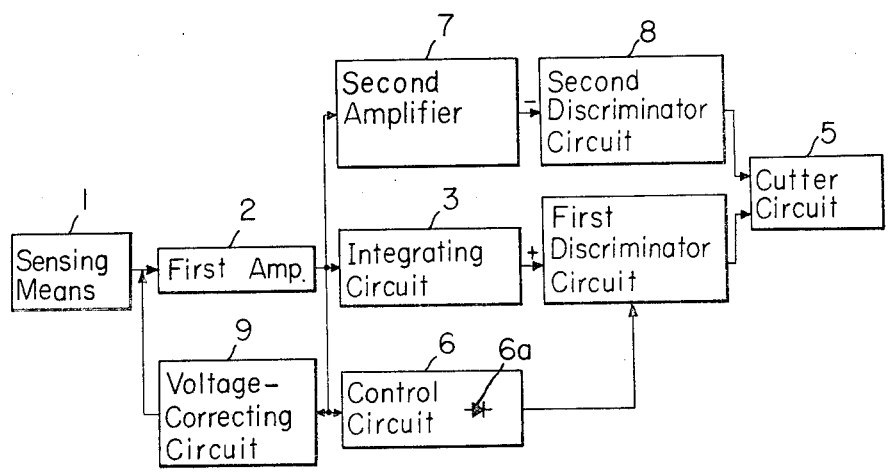

Our present invention relates to a photoelectric device for monitoring a continuously running filament and rejecting portions whose thickness deviates from a given norm.

In photoelectric yarn-rejecting devices currently in use, a yarn to be tested is run through an optical system which focuses a beam of light upon the yarn whereby the amount of light passing the yarn varies with the deviation of the yarn diameter from the desired magnitude; this variation in light intensity is converted into a varying electrical resistance by a photoelectric transducer, the yarn being automatically severed by a cutter when the magnitude of an electrical signal from that transducer exceeds a predetermined value. The essential components of the conventional system comprise a light source, a sensing means including the photoelectric transducer, an amplifier, a voltage discriminator, a cutter and a circuit for driving the cutter.

However, this well known yarn-monitoring system is not free from drawbacks. For example, in one type of conventional device the circuit for driving the cutter operates only when the diameter of the yarn becomes so large that the difference between the diameters of an enlarged portion and an immediate preceding portion exceeds a predetermined value. This predetermined value, or threshold for actuation of the cutter, must be so chosen as to avoid cutting the yarn introduced into the sensing means at the start of the test. Thus, if the threshold is set at 40% of the standard diameter, and since the difference between the amounts of light received in the absence and in the presence of the yarn (that is, the variation of the light intensity at the time of its introduction) corresponds to a variation in diameter from zero to exactly or approximately 100% (depending on whether the yarn is of standard or abnormal thickness), the resulting large variation in signal strength exceeds the threshold of 40%; accordingly, the cutter operates and the yarn is cut. Therefore, in order to avoid premature cutting of the yarn introduced into the sensing means, the operating threshold of the device must correspond to a change in thickness by more than 100%. For the above reason, the response level of this type of conventional device must be set so high that the device will not detect and cut yarn whose diameter varies by less than 100%.

There is another type of conventional device in which the cutter is actuated when the yarn diameter becomes so small that the difference between the diameter of a reduced portion and the diameter of an immediately preceding portion exceeds a predetermined value (in other words, the operation of this device is just the reverse of that described above) to avoid the risk of cutting the yarn just introduced into the sensing means (see, for example, Japanese printed patent specification No. 40/28,893). However, in the case of yarn that exceeds the standard diameter, the yarn is not cut out until after the diameter returns to normal thickness. Meanwhile the yarn exceeding the standard diameter is being wound up. Thus, after the automatic cutting, the operator must unwind the yarn and, by visual inspection, determine what portion of it exceeds the set standard and cut it out manually.

In this conventional system, therefore, a reduced-diameter yarn portion is rejected immediately, whereas a portion of excess thickness is rejected only upon its termination by generating a signal wave indicating a decrease in diameter, i.e. an increase in the amount of light received by the sensing means. While the sensitivity of this device is high compared with that of the aforedescribed system, a length of yarn exceeding the standard diameter and continuing to the end without decrease in thickness cannot be detected. Moreover, if the diameter gradually increases over a length of several meters, as is often the case with a type of defect known as "uneven sliver," a detectable output signal may not be generated since this circuit is designed to deal with thickness deviations occuring over a length of twenty centimeters at the most.

The object of the present invention is to provide a photoelectric control system of this general type designed to eliminate the above-mentioned drawbacks. We realize this by providing a circuit arrangement including an integration circuit and a control circuit. Generally, since spun yarn is formed from a plurality of single fibers ranging from several centimeters to twenty-odd centimeters in length, arranged as uniformly as possible and then twisted, small changes in diameter necessarily occur throughout its whole length, and the resulting output of a photoelectric sensor is a low-amplitude alternating signal present as long as the yarn is running.

This ripple signal is of very small magnitude as compared to that generated by a non-standard portion that needs to be removed, but is sufficient to give rise to a measurable D-C voltage, upon amplification and rectification, serving as a monitoring signal which indicates that the yarn is running. Since this monitoring signal does not exist before the introduction of the yarn into the sensing means, the detected output corresponding to increase in diameter (i.e. to decrease in light) at the time of yarn insertion is blocked in its absence and the cutter is not actuated. The detected output generated upon an increase in diameter during the run gives rise to a cutter-actuating signal, as does the detected output generated by a decreasing yarn diameter.

Figure 2:

Other objects, features and advantages of our invention will become apparent from the following description of a preferred embodiment, given with reference to the accompanying drawing in which:

FIG. 1 is a block diagram showing a yarn-monitoring system in accordance with the present invention; and FIG. 2 is a set of graphs showing wave forms of detected output signals for various non-standard yarn portions to be removed by the system of FIG. 1.

In FIG. 1 we have shown a photoelectric sensing means 1, a first amplifier 2 receiving the output of sensing means 1, an integrating circuit 3 for the output signal of amplifier 1 which varies in proportion to the variation in the intensity of light received, and a discriminator circuit 4 adapted to generate a signal for actuating a cutter drive 5, the discriminator circuit 4 becoming operative when the magnitude of the output of integrator 3 rises in response to a decrease in the light quantity received by sensor 1. The operating threshold of discriminator circuit 4 is set by the output of a control circuit 6, consisting of an ancillary amplifier and a rectifier 6a. This operating threshold is very high when there is no output from control circuit 6 and drops to a normal level in the presence of such an output, acting as a switching signal. There is further provided a second amplifier 7, followed by a second discriminator circuit 8 responsive to a signal corresponding to an increase in the quantity of light. Cutter drive 5 is also actuatable by the output of this second discriminator circuit 8. A voltage-correction circuit 9 generates a compensating D-C voltage corresponding to a normal thickness of the yarn. In circuit 9 this compensating voltage is generated in response to the decrease in light magnitude at the time of yarn insertion; on being fed back to the output of amplifier 2, this voltage constitutes a reference potential enabling the detection of both positive and negative deviations of yarn diameter from normal. Thus, the corrected output of amplifier 2 is the difference between this reference potential and the detected signal.

The operation of the system according to our invention will now be explained. When no yarn passes the sensing means 1, there is no output from control circuit 6, so that the operating threshold of discriminator circuit 4 is high. Therefore, when the yarn is first inserted into sensing means 1, the signal produced by this insertion is amplified at the differential amplifier 2 and integrated at circuit 3, but the discriminator circuit 4 is in its state of low sensitivity and does not operate. As long as the illumination of sensing device 1 from an associated light source (not shown) continues at a reduced rate, and there is no increase in the amount of light, there also is no output capable of triggering the second discriminator 8. The operating threshold of discriminator circuit 4 remains at its high level while the output of amplifier 2 is reduced by the corrective signal from circuit 9, hence the yarn inserted in sensing means 1 is not cut.

The unavoidable fluctuations in the diameter of the running yarn generate the aforedescribed high-frequency noise signal or ripple voltage in the output of sensing means 1 which is amplified by the amplifier 2, as well as by the ancillary amplifier in control circuit 6, and then rectified in that circuit. The resulting rectified output of circuit 6 lowers the operating threshold of discriminator 4 which thereupon assumes its normal operating threshold. The rectifier 6a in circuit 6 is designed to respond only to those half-cycles of the ripple signal which correspond to an increase in the amount of light, i.e., to a decreasing yarn diameter; as long as the amount of light continues to decrease, as at the time of insertion of the yarn, there is no rectified output.

After the yarn has started to run and discriminator 4 has reached its normal threshold, the passage of a yarn portion of excess diameter gives rise to a signal wave which is amplified in stage 2 and then integrated in circuit 3. When the magnitude of the integrated output of circuit 3 exceeds the operating threshold of discriminator circuit 4 which is now at its regular, lower level, this discriminator produces a signal to actuate the cutter drive 5 whereupon the oversized yarn is cut off.

Typical yarn irregularities to be excised are termed "nep," "fly," "slub," "uneven weight" and "uneven sliver." The "nep" and the "fly" range in thickness from several yarn diameters to several tens of yarn diameters and have a length of several millimeters. The "slub" has from two to five times the diameter of the filament and a length of several centimeters. The "uneven weight" represents a portion of yarn whose diameter exceeds the standard diameter by a ratio ranging from tens of percent to one-hundred and several tens of percent and whose length ranges from about ten to twenty centimeters. The "uneven sliver" has a portion increasing to about twice the normal size within a length of one to several meters and another portion decreasing at the same rate to normal size. An entrained filament adds one or two threads to the original yarn along several tens of meters.

FIG. 2 shows graphically the detected output signals of sensor 1 (thin lines) for these size variations and the integrated output voltages of circuit 3 (heavy lines) resulting therefrom, graph a corresponds to the wave form generated in the case of the "nep" and "fly"; graph b corresponds to the "slub," graph c corresponds to the "uneven weight," and graph d corresponds to the compound yarn with one or more entrained filaments. In each of these cases, the reference potential corresponding to standard diameter is delivered by voltage-correcting circuit 9 to the input of ampliler 2, thus producing a defect signal proportional to the deviation from regular size in addition to the ripple signal described above, the combined signal being integrated by circuit 3. Since the cutter is driven as soon as the output of the integrator attains the threshold of discriminator circuit 4, any defective yarn portion is excised whenever the deviation in diameter times the length of this portion reaches a predetermined value. Thus, the defective portion is cut off at a length that is nearly inversely proportional to the extent of the deviation. Therefore, in such irregular yarn portion the part of increased diameter is substantially completely removed.

The defect signal produced by a yarn portion of insufficient diameter passing the sensing means 1 is of inverted phase (indicated in FIG. 1 by a minus sign) in comparison with the wave form produced by a yarn portion of excessive diameter (indicated by a plus sign) so that the integrated output decreases and discriminator circuit 4 does not operate. If, however, the magnitude of this signal after successive amplifications in first amplifier 2 and second amplifier 7 surpasses the operating threshold of the second discriminator circuit 8, the cutter drive 5 is actuated. Consequently, the undersized yarn portion is cut off as soon as the deviation reaches a predetermined level. Thus, any defective portion of the monitored yarn is eliminated.

When the yarn is inserted into sensing means 1, a starting signal proportional to the diameter of the yarn appears in the ancillary amplifier of control circuit 6. This starting signal is very large compared with the signal normally generated during the running of the yarn. The compensating voltage fed back to amplifier 2 by corrective circuit 9 stabilizes the output of this amplifier at the proper level within one or two seconds from the start of the running of the yarn, this compensating potential being continually present in the output of circuit 9.

If an oversized yarn portion is initially inserted, the cutter drive 5 is not operated immediately regardless of the extent of the deviation of the yarn diameter. If the diameter of the yarn returns to normal before the discriminator circuit 4 has bee nreset to its more sensitive state, the integrator output is reduced so that the cutter circuit 5 does not operate. If, however, the excess-diameter portion which exists upon insertion continues after the yarn starts running, as it would in the case of an entrained filament, the integrator output remains high and the yarn is cut off as soon as the discriminator circuit 4 switches to its normal operating condition.

If the signal phase in the output of either the second amplifier 7 or the integration circuit 3 is inverted, and if the two signals are applied without mutual interference to a suitable combining circuit to produce a unipolar (positive or negative) output voltage, we can use a single discriminator in lieu of the two circuits 4 and 8. It is also possible, of course, to provide the monitoring circuit 9 and the control circuit 6 with a common amplifier.

Thus, apart from detecting sudden and large changes in diameter as in the case of a "slub," "nep" and the like, the system according to our invention accurately detects both increases in diameter by less than 100% and gradual deviations from the standard diameter (as determined by the magnitude of the reference potential from circuit 9) not ascertainable with conventional equipment, as well as undersized yarn portions.

A further advantage of our invention is that each amplifier circuit may operate on a low signal level.

In the above system the voltage-correction circuit 9 may be omitted, provided the output of amplifier 2 and therefore the output of integrator 3 at the time of yarn insertion are held to substantially zero; in that case the cutter is not operated when standard yarn is inserted. Upon the insertion of a compound filament, the integrated output is then substantially zero even after the yarn starts running, so that the yarn cannot be cut off. If, however, the diameter of the yarn increases over a length of less than several meters, as in the case of an uneven sliver, this defect can be eliminated as the output of first amplifier 2 attains substantially its normal value and the signal wave corresponding to the abnormal yarn portion is integrated in circuit 3. The deviation from the norm is then determined on the basis of an average diameter established during a certain period.

What is claimed is:

1. A system for monitoring a filament and excising portions thereof deviating from a predetermined standard diameter, comprising:
   photoelectric sensing means for generating a signal voltage varying with the diameter of a filament continuously moving past said sensing means;
   first discriminator means in the output of said sensing means responsive to first deviations of said signal voltage in a sense corresponding to an increase of said diameter beyond a standard size;
   second discriminator means in the output of said sensing means responsive to second deviations of said signal voltage in a sense corresponding to a decrease of said diameter from said standard size;
   control means in the output of said sensing means for inhibiting operation of said first discriminator means in response to a starting signal due to the insertion of the filament, said control means being responsive to a ripple voltage generated by said sensing means upon the movement of the filament therepast for applying to said first discriminator means a switching signal making same responsive to said first deviations, said second discriminator means being operative independently of said switching signal;
   cutting means connected to the outputs of said first and second discriminator means for severing said filament in response to either of said deviations.

2. A system as defined in claim 1 wherein the output of said sensing means includes circuit means for generating a reference potential upon incipient motion of said filament past said sensing means, and comparison means receiving said signal voltage and said reference potential to determine said first and second deviations.

3. A system as defined in claim 2 wherein said first dicriminator means has a high-sensitivity state of operation and a low-sensitivity state of operation, said control means being effective to switch said first discriminator means from said low-sensitivity state to said high-sensitivity state substantially concurrently with the generation of said reference potential.

4. A system as defined in claim 2 wherein said comparison means is a differential amplifier, further comprising integrating means inserted between said amplifier and said first discriminator means.

5. A system as defined in claim 4, further comprising a second amplifier inserted between said differential amplifier and said second integrating means.

6. A system as defined in claim 1 where said control circuit includes rectifier means for generating said switching signal from variations in said signal voltage due only to a decrease of said diameter.

References Cited

UNITED STATES PATENTS

| 3,264,922 | 8/1966 | Peyer | 83—365 |
| 3,303,698 | 2/1967 | Loepfe. | |

FOREIGN PATENTS

| 861,225 | 2/1961 | Great Britain. |
| 899,827 | 6/1962 | Great Britain. |
| 914,890 | 1/1963 | Great Britain. |
| 985,396 | 3/1965 | Great Britain. |

FRANK T. YOST, Primary Examiner

U.S. Cl. X.R.

83—366, 371; 250—219